United States Patent [19]

Banzai et al.

[11] Patent Number: 4,629,954
[45] Date of Patent: Dec. 16, 1986

[54] CLOSED LOOP CONTROL METHOD FOR HYDRAULIC APPARATUS

[75] Inventors: Hideo Banzai, Mishima; Goh Ikeda; Nobukatsu Omura, both of Numazu, all of Japan

[73] Assignee: Toshiba Kikai Kabushiki Kaisha, Tokyo, Japan

[21] Appl. No.: 613,622

[22] Filed: May 24, 1984

[30] Foreign Application Priority Data

May 26, 1983 [JP] Japan .................................. 58-93144

[51] Int. Cl.$^4$ ............................................. G05B 13/00
[52] U.S. Cl. ..................................... 318/561; 318/632; 318/302
[58] Field of Search ............... 318/561, 650, 567, 301, 318/302, 335; 364/494, 510; 91/316, 363 R, 363 A, 364, 361; 361/159

[56] References Cited

U.S. PATENT DOCUMENTS

| | | | |
|---|---|---|---|
| 4,282,467 | 8/1981 | Gruesbeck | 318/561 |
| 4,369,400 | 1/1983 | Turner | 318/561 |
| 4,386,626 | 6/1983 | Hehl | 361/159 X |
| 4,404,505 | 9/1983 | Swanson | 318/561 |
| 4,427,896 | 1/1984 | Waldron | 364/494 X |
| 4,486,693 | 12/1984 | Hamati | 318/561 |

Primary Examiner—William M. Shoop, Jr.
Assistant Examiner—Patrick C. Keane
Attorney, Agent, or Firm—Stevens, Davis, Miller & Mosher

[57] ABSTRACT

A non-linear function f(A) of an effective value D' with respect to a desired value A regarding speed, pressure or the like of an actuator of a hydraulic apparatus in a closed loop control for the hydraulic apparatus is operated and a value regarding quantity of electricity to be applied to a valve of a drive mechanism of the hydraulic apparatus is outputted as a non-linear function f(A) in a case where a non-linear function D=f(A) is established between the desired value A and an effective value D regarding speed, pressure or the like of the actuator in the opened loop control for the hydraulic apparatus.

2 Claims, 5 Drawing Figures

CLOSED LOOP CONTROL METHOD FOR HYDRAULIC APPARATUS

BACKGROUND OF THE INVENTION

This invention relates to an improvement of a hydraulic control system, and more particularly, to a closed loop control method for the hydraulic control system.

The closed loop control of a hydraulic apparatus is generally performed by a method comprising the steps of detecting a speed and/or a pressure of an actuator disposed in a hydraulic cylinder means by a detector, comparing the value thus detected with a desired value of the speed and/or pressure preliminarily obtained, and controlling an input current for a drive mechanism such as servo-valve which controls the operation of the actuator in accordance with the compared result, i.e. the difference value therebetween. According to the closed loop control method of the type described above, as shown in FIG. 1, the relationship between the detected value and the desired value which was preliminarily set is 1:1 (i.e. is expressed linearly by an equation $Y=X$, line 1). This fact means that the actuator can be operated repeatedly under the same operational condition.

Although the hydraulic apparatus can be controlled by the closed loop control method as referred to above, the apparatus can also be operated under an opened loop control, in which a preliminarily set desired value regarding the speed and/or pressure of the actuator acts on a drive mechanism such as a servo-valve or proportional valve thereby to control an input current for the drive mechanism. However, the opened loop control is generally affected largely by an external disturbance such as a temperature, load pressure and the like which affect the operation of the actuator. In addition, the relationship between the desired value and the detected value regarding the speed and/or pressure of the actuator is expressed by a curve 2 as shown in FIG. 1. Moreover, in the opened loop control, it is difficult to maintain the operating condition, even if once determined, because of the external disturbance.

The operational characteristics or phenomenon described above will be described in detail hereunder in conjunction with FIG. 2, in which are shown relationships with respect to the closed and opened loop controls respectively between a desired value A and a value B regarding the quantity of electricity to be applied to a valve such as servo-valve of the hydraulic apparatus, between the value B and a value C regarding an opening degree of the valve, and between the opening degree C and an effective value D.

With the opened loop control, a value b regarding the quantity of electricity with respect to a desired value a (i.e. set value) is in the relationship 1:1, which is expressed by the equation $B=A$ ... (11) as shown in FIG. 2. The value b and a value c regarding opening degree of the valve are also in the relationship 1:1, which is expressed by the equation $C=B$ ... (12).

However, the relationship between the value c and an effective value d does not become a relationship 1:1 because of the external disturbance such as load pressure, temperature or the like affecting the actuator and is expressed by a non-linear function f(x), i.e. the equation $D=f(c)$ ... (13), which is predetermined with respect to the valve of the hydraulic apparatus to be used. According to the relationship $A=B=C$, the effective value D is represented by the following equation (14) in view of the relationship between the values A and B.

$$B=f(a) \tag{14}$$

Therefore, the effective value with respect to the desired value a in the opened loop control does not become a value d and takes a value $d'=f(c)=f(a)$.

On the other hand, with the closed loop control, the relationships between the desired value A and the value B regarding the quantity of electricity, between the value B and the value C regarding the opening degree of the valve, and between the value C and the effective value D are all in the relationship 1:1 as shown by the lines 11, 12 and 13' as shown in FIG. 2, thus the effective value being a value d with respect to the desired value a.

With the closed loop control, as is apparent from the aforementioned reasons, defects or disadvantages of the closed loop control, against its easy operation, will be recognized as follows.

(a) In a case where two hydraulic machines or apparatus which are provided with the closed and opened loop control functions attain the same controlling ability, respectively, the operating conditions of the machines or apparatus are different from each other in spite of the same controlling ability. In other words, as can be understood from FIGS. 1 and 2, the detected value y in the closed loop control is larger than that in the opened loop control by a value $\Delta y$ with respect to the same desired value x in the both controls. This fact means that in the closed loop control of the hydraulic apparatus are detected the speed and pressure higher than those in the opened loop control. Thus, even if the desired valves were preliminarily set to the same values for the hydraulic machines or apparatus provided with the closed and opened loop control functions, respectively, the detected speed and pressure are different with respect to the both hydraulic machines, which requires a troublesome procedure for controlling or handling the machines.

(b) Regarding resolving powers of the controls, as can be understood from FIG. 1 in which when the desired value $x_1$ is changed to the value $x_2$ ($x_1<x_2$), the variation of the resolving powers of the opened loop control is $\Delta y_1$ and that of the closed loop control is $\Delta y_2$ which is larger than $\Delta y_1$, the opened loop control is superior to the closed loop control in a low speed operation region of the hydraulic machine. Accordingly, in order to identify the resolving power of the closed loop control to that of the opened loop control, it is necessary to finely divide the desired value in the closed loop control to obtain substantially the same resolving power as that in the opened loop control.

(c) Since, in a hydraulic machine of the closed loop control, the control in the low speed operation region is considerably difficult, the closed loop control is not generally suitable for molding a product which is relatively thick, which requires a low molding speed control, for example, for a lens production in an injection molding machine.

SUMMARY OF THE INVENTION

An object of this invention is to obviate defects regarding closed loop control of a hydraulic apparatus of prior art and to provide an improved closed loop control method for the hydraulic apparatus in which an effective value in the closed loop control coincides with that of the opened loop control in a case where desired values for the control are the same values in the closed and opened loop controls.

According to this invention, there is provided a closed loop control method for hydraulic apparatus of the type comprising the steps of detecting speed, pressure and the like of an actuator of the hydraulic apparatus, comparing the detected value with a desired value preliminarily set regarding the speed, pressure and the like of the actuator, and serving a difference value obtained by the comparing step to act on a drive mechanism for controlling the actuator thereby to control an input current for the driving mechanism. The control method is characterized in that in a case where a non-linear function $D = f(A)$ is established between a desired value A and an effective value D regarding the speed, pressure and the like of the actuator in an opened loop control, a value regarding quantity of electricity to be applied to a valve of the drive mechanism is operated and outputted as a non-linear function $f(A)$ with respect to the desired value A so that a non-linear function $D' = f(A)$ is established between an effective value $D'$ and the desired value A in the closed loop control.

According to this invention, an effective value in the closed loop control of the hydraulic apparatus can accord with that of the opened loop control in a case where desired values regarding speed, pressure or the like of the actuator of the hydraulic apparatus in both controls are the same values, whereby disadvantages or problems on management or handling of a conventional closed or opened loop control can be eliminated and a good resolving power can be obtained even in a closed loop control and even at a low speed region of the hydraulic apparatus.

DESCRIPTION OF THE PREFERRED EMBODIMENT

As described hereinbefore, it will first be noted that a setting device in the controlling apparatus for carrying out the method according to this invention treats various values such as regarding quantity of electricity to be applied to the valve in the hydraulic apparatus or opening degree of the valve, but these values should be represented by "%" with respect to the maximum value being 100%, and not expressed by physical values.

Figure 2:
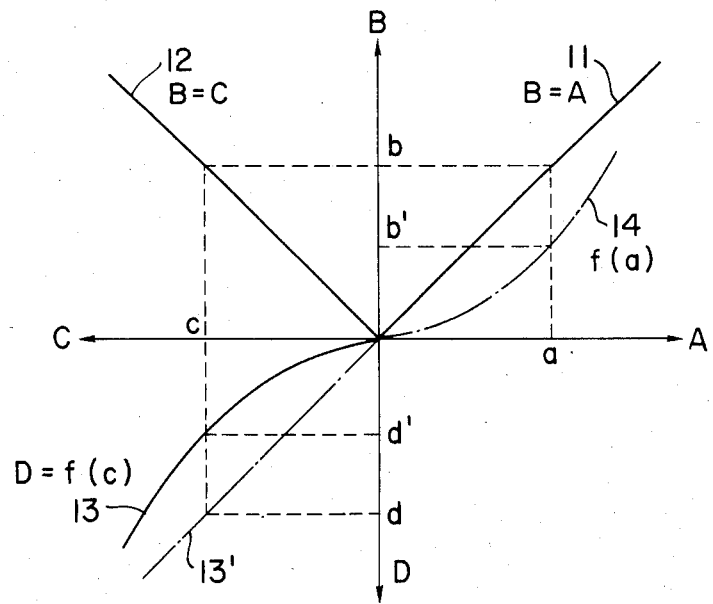
FIG. 2 is a graph also showing relationships between the desired value and a value regarding quantity of electricity to be applied to a valve, between the value of the quantity of electricity and a value regarding the opening degree of the valve, and between the value regarding the opening degree of the valve and an effective value in the closed loop control and the opened loop control, respectively.
Figure 3:
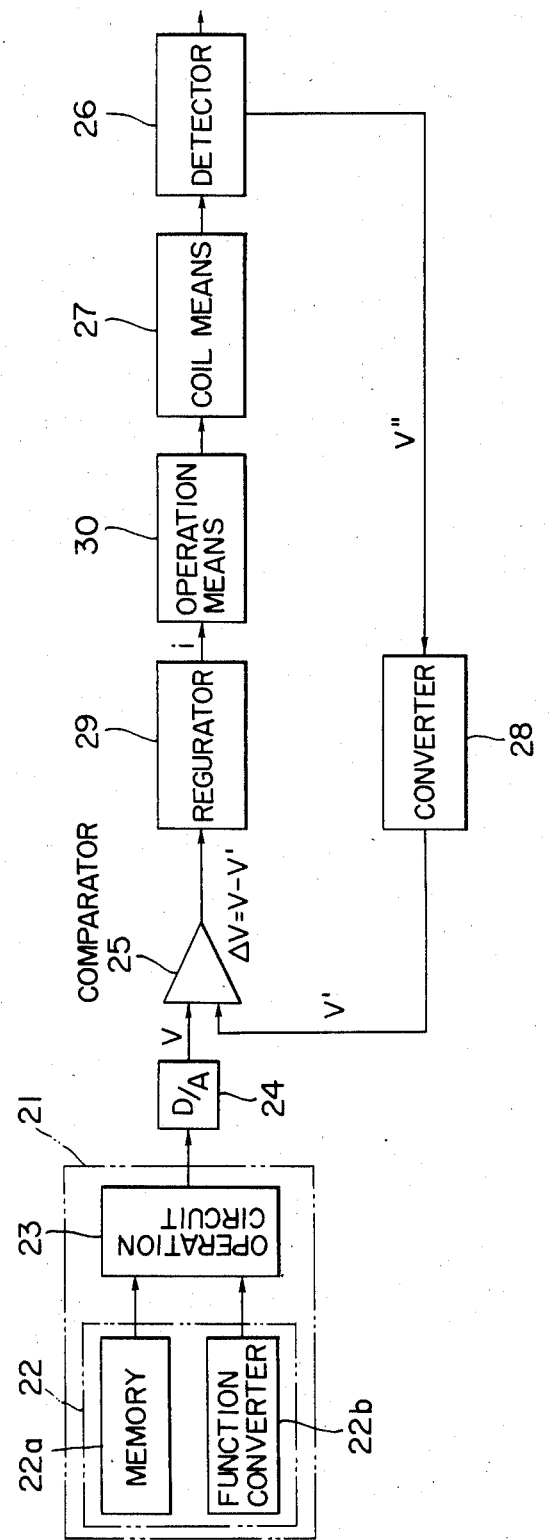
FIG. 3 illustrates a block diagram of a control circuit means for carrying out a closed loop control method according to this invention.
Figure 5:
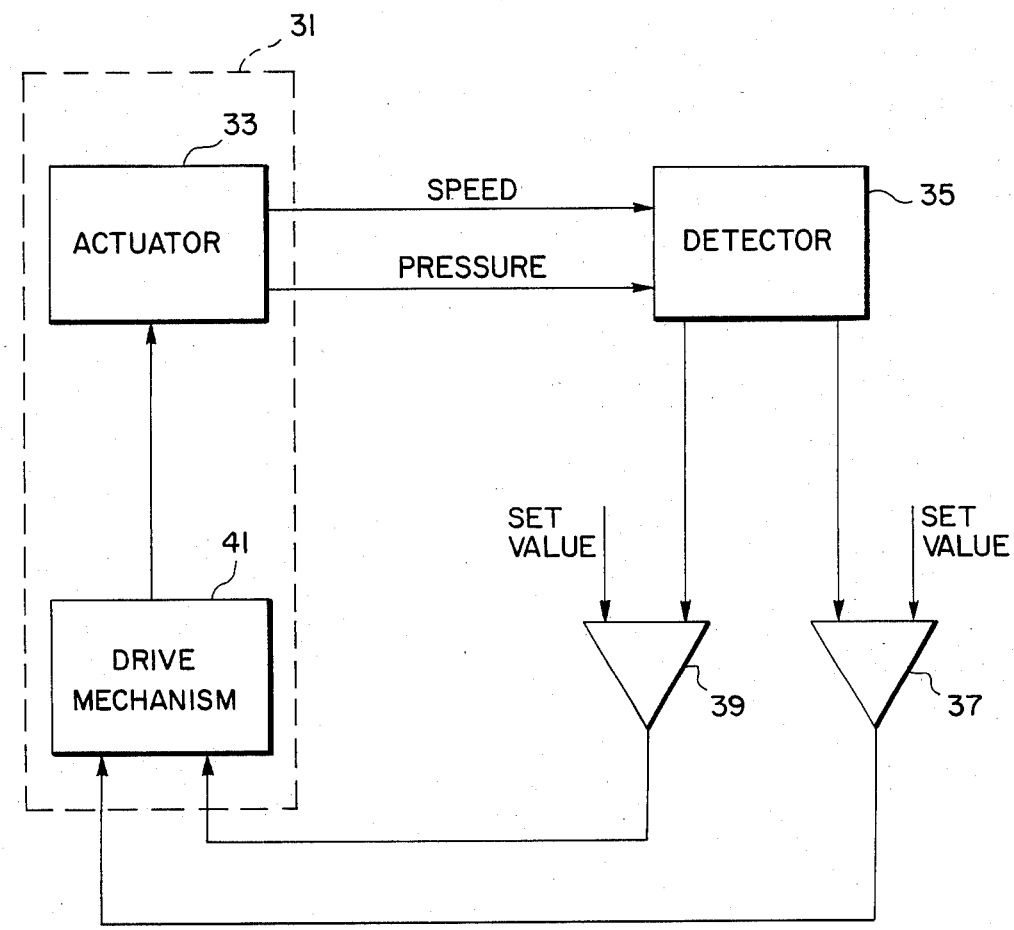
FIG. 5 shows an apparatus for implementing the closed loop control method of the present invention.

FIG. 3 shows a block diagram representing one embodiment of an apparatus for carrying out the method of this invention. The apparatus comprises a desired value setting means 21 including a memory means 22 and an operation circuit means 23. The memory means 22 includes a memory 22a for storing the desired value and a function converter 22b for setting the natural non-linear function $f(x)$ regarding characteristics of a valve such as proportional valve or servo-valve of the hydraulic apparatus and the operation circuit means 23 serves to calculate a function $f(A)$ regarding quantity of electricity to be applied to the valve from the desired value A stored in the memory 22a the non-linear function $f(x)$ in the function converter 22b. A comparator 25 is operatively connected to the desired value setting device 21 through a digital-to-analog (D/A) converter 24, and as shown in FIG. 2, the comparator 25 operates to compare the outputted value v of the quantity of electricity from the desired value setting device 21 with the outputted value v' converted from the physical amount regarding such as speed, pressure, or the like detected by a detector 26. The value v' is obtained by converting physical amount v" detected by the detector 26 to the level of the value v outputted from the setting device 21 through a converter 28. The output Δv (i.e. v−v') generated from the comparator 25 is converted through a regulator 29 into current i which serves to actuate a coil means 27 of the valve through an operating means 30.

According to the control means described above, the output v representing the desired value in the closed loop control is preliminarily converted to the value having the same level as that in the opened loop control so as to coincide the effective value in the closed loop control with that to be obtained in the opened loop control to thereby eliminate the defects in the closed loop control of conventional technical art of field and to attain operational merits of the opened loop control in addition to those in the closed loop control.

In an alternation of this embodiment, a desired value setter and a function generator may be used instead of the memory means and the D/A converter for generating output regarding the operation conditions such as speed and pressure of a hydraulic means.

Figure 1:
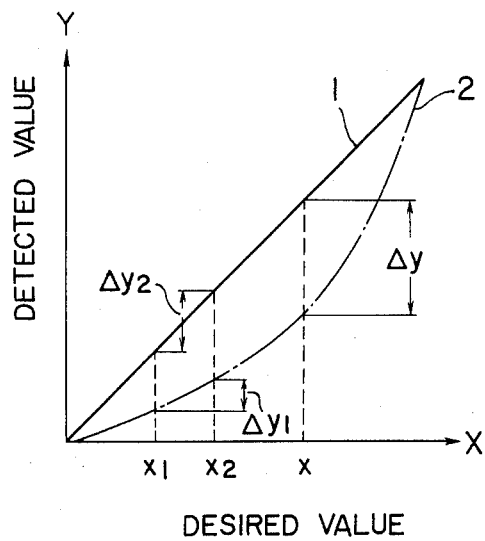
FIG. 1 is a graph showing relationship between a desired value and a detected value in a closed loop control and an opened loop control of a hydraulic apparatus.
Figure 4:
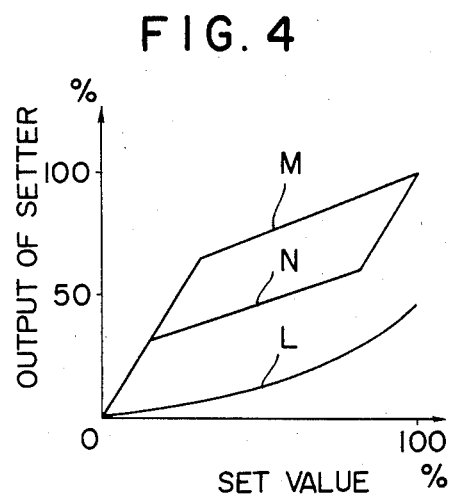
FIG. 4 shows one example of the control according to the closed loop control method of this invention.

FIG. 4 shows one example of the control according to the closed loop control method of this invention, in which a relationship between a set value (%) and an output (%) of a setting device such as a digital switch is shown in various functions with curves L, M and N. By setting the operation condition to provide the curve L is obtained an improved resolving power in a low flow rate region to move the actuator at a low speed. Also by setting the operation conditions to provide the curves M and N are obtained improved resolving powers at high and intermediate flow rate regions, respectively. The relationships regarding the functions L, M and N can be selected optionally by arranging switch means in the operation circuit means 23 thereby to improve the resolving powers in the high, low and intermediate flow rate regions by using one setting device. The selection of the switch means can be done manually as well as automatically.

What is claimed is:

1. A closed loop control method for hydraulic apparatus comprising the steps of: (a) detecting at least one of speed and pressure of an actuator of said hydraulic apparatus, (b) comparing a detected value from step (a) with a desired value preliminarily set regarding at least one of speed and pressure of the actuator, (c) serving a difference value obtained by step (b) to act on a drive mechanism for controlling the actuator thereby to control an input current for the driving mechanism, and (d) presetting a non-linear function D=f(A) between a desired value A and an effective value D regarding at least one of speed and pressure of the actuator in an opened loop control, a value regarding a quantity of electricity to be applied to a valve of the drive mechanism being operated upon and outputted as a non-linear function f(A) with respect to the desired value A so that a non-linear function D'=f(A) is established between an effective value D' and the desired value A in the closed loop control.

2. The method according to claim 1 wherein the operation of said non-linear function f(A) is carried out by an operation circuit including a memory means and a digital-to-analog converter.

* * * * *